Feb. 26, 1924. 1,484,731
F. S. MALM
MANUFACTURE OF SPONGE RUBBER ARTICLES
Filed Feb. 25, 1919
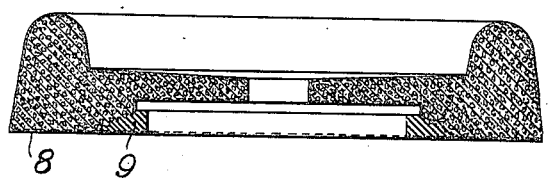
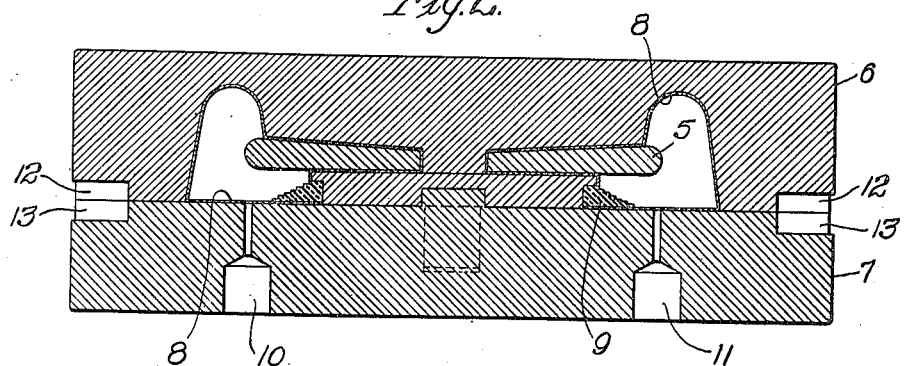
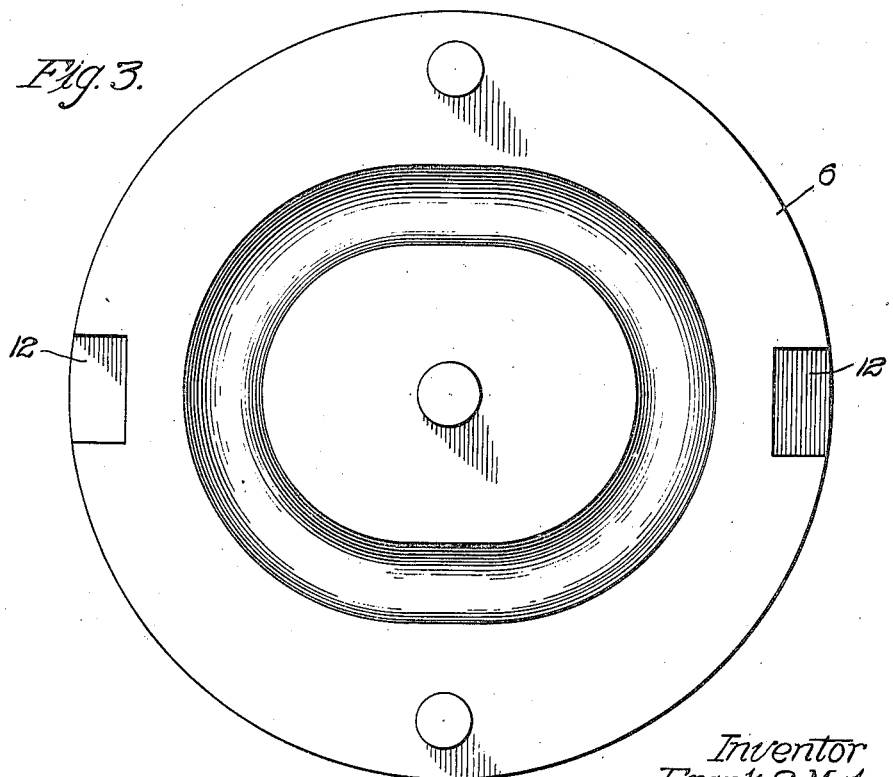
Inventor
Frank S. Malm.

Patented Feb. 26, 1924.

1,484,731

UNITED STATES PATENT OFFICE.

FRANK S. MALM, OF CHICAGO, ILLINOIS, ASSIGNOR TO WESTERN ELECTRIC COMPANY, INCORPORATED, OF NEW YORK, N. Y., A CORPORATION OF NEW YORK.

MANUFACTURE OF SPONGE-RUBBER ARTICLES.

Application filed February 25, 1919. Serial No. 279,171.

*To all whom it may concern:*

Be it known that I, FRANK S. MALM, a citizen of the United States, residing at Chicago, in the county of Cook and State of Illinois, have invented certain new and useful Improvements in the Manufacture of Sponge-Rubber Articles, of which the following is a full, clear, concise, and exact description.

This invention relates to sponge rubber articles, and more particularly to ear pieces for aviators' telephone head sets and the manufacture thereof.

This invention has for its object the protection of sponge rubber articles from deterioration by oxidation and to better adapt such articles when used in aviators' telephone head sets or the like for contact with the human skin.

In accordance with the general features of this invention the sponge rubber articles are provided with an outer coating of smooth surfaced rubber which is applied thereto in the process of the manufacture of the articles. In the preferred form of the invention the coating for the articles is applied in the molding or forming and vulcanizing steps by which the body is produced. This may be accomplished by covering the interior surface of the mold with a coating of rubber compound which will, on formation and vulcanization of the sponge rubber body, become attached thereto to form the coating surface of the article.

In the drawings in which this invention is illustrated in connection with a receiver ear piece for aviators' head sets, Fig. 1 is a cross-sectional view of the completed article;

Fig. 2 is a cross-sectional view of the mold showing parts in place prior to the forming and vulcanization processes, and Fig. 3 is a plan view and one section of the mold indicating the form of the article.

In the practice of the process of this invention the body portion of the article is formed of a rubber composition containing substantially the following ingredients in the proportions given:

Smoked sheet rubber, approximately _____ 37.000%
Coucho rubber _____ 28.375%
Ammonium carbonate _____ 17.625%
Vermillion English pale _____ 4.250%
Barytes _____ 6.500%
Sulphur _____ 4.250%
Paraffin _____ .500%
M. R. substitute _____ .500%
Accelerator _____ 1.000%

While this composition may be varied both as to the ingredients and amounts, the one given has been found to produce an article which satisfactorily meets special requirements for articles of this kind.

The Coucho rubber is included in this compound to facilitate the workability of the mixture; the sulphur for the vulcanizing agent; the barytes is a filler which in the colored articles is used to control the shades; the paraffin and M. R. substitute facilitate the mixing of the compound and also retard oxidation of the finished product, and ammonium carbonate is used to obtain the gas generated to produce the cellular structure of the compound.

The composition of the above description is thoroughly mixed, and a blank 5 formed therefrom is placed between upper and lower mold members 6 and 7. Prior to the placing of this blank 5 in the molds, however, the inner surfaces of the mold members 6 and 7 have been treated or painted with a coating 8 of a composition similar to that of the blank 5 with the exception that the ammonium carbonate or other gas forming ingredient has been omitted. Also there has been placed upon the lower mold members 7 a soft solid ring member 9 having serrated edges and which ring has been given a primary vulcanizing in a soft metal mold. With the several elements in the mold the two members 6 and 7 are clamped together and the loaded molds are put into a vulcanizer, to which compressed air is admitted, and the vulcanizing period started and continued for approximately four hours at an air pressure of 55 pounds per square inch, the steam pressure in the jacket being maintained at approximately 110 pounds pressure per square inch. During the early period in the vulcanizer the ammonium carbonate decomposes and is broken down into gases which escape from the compound in the mold which are vented, as indicated at 10 and 11, and caused the cellular structure of the rubber which gives to it its spongy characteristics. The air pressure in this case retards the too rapid escape of gases which are to cause sponging, prevents entire volatilization of the solvent, and serves also to retard the compound which is plastic at this temperature from escaping through the vents 10 and 11 in the molds. This pressure, however, does not prevent the ultimate escape of the ammonium carbonate gases.

The coating or layer 8 of the rubber compound to which the interior of the mold is treated, the blank 5, and the ring 9 being in a plastic condition, will become closely adherent as the blank 5 expands in response to the generation of the gases by means of the ammonium carbonate, and these several parts will, upon vulcanization, become securely fastened together to produce the finished article in the form desired.

The smooth coated surface of the article not only prevents the accumulation of foreign matter in the cellular structure, which would be detrimental when used in contact with the human skin, but it also prevents the oxidation and deterioration of the relatively thin walls separating the cells of the structure, which would occur if these walls were exposed directly to the air.

Openings or notches 12 and 13 are provided in the mold members 6 and 7 for the insertion of tools for separating the molds after the several steps of the process have been completed.

What is claimed is:

1. The method of producing smooth surfaced sponge rubber bodies, which consists in locating a body material and a surfacing material in separated relation in a mold and bringing them together in intimate relation by vulcanization.

2. The method of producing smooth surfaced sponge rubber bodies, which consists in blowing a sponge rubber batch into contact with a surfacing layer and vulcanizing the two layers simultaneously.

3. The method of producing smooth surfaced sponge rubber bodies, which consists in forming a rubber batch with a blowing material therein, a similar batch without the blowing material, locating the first batch within a thin sheet of the second batch without filling said second batch, and applying vulcanizing heat to bring the two batches into intimate contact by the blowing of the first batch and simultaneously vulcanizing the two batches.

4. The method of producing smooth surfaced sponge rubber bodies, which consists in locating a batch containing blowing material in a mold without filling the mold, surfacing the inside face of the mold with a batch from which the blowing material has been omitted, and applying a vulcanizing heat to the mold.

5. The method of producing smooth surfaced sponge rubber bodies by molding, which consists in applying to the surface of a mold a thin coating of rubber compound, and molding and vulcanizing the sponge rubber compound in the mold which is prepared.

6. The herein described method of making sponge rubber articles, consisting in first locating the composition within a mold provided with openings for the escape of gases, the composition but partially filling the mold, then vulcanizing the composition in the mold, causing the composition to swell or expand and fill the mold and creating within the composition a large number of cells.

7. The herein described method of making sponge rubber articles, consisting first in the formation of a composition of smoked sheet rubber, sulphur, ammonium carbonate, a filler, and an accelerator in substantially the proportions stated, then locating said composition in a mold provided with openings for the escape of gases, partially filling the mold, and then vulcanizing the composition in the mold.

8. The herein described method of making sponge rubber articles, consisting first in the formation of a composition of smoked sheet rubber, a vulcanizing agent, a filler, and a gas producing substance, locating the composition within a mold, the composition but partially filling the mold, then vulcanizing the composition in the mold, causing it to swell or expand and fill the mold and creating within the composition a large number of cells.

In witness whereof, I hereunto subscribe my name this 6 day of February A. D., 1919.

FRANK S. MALM.